United States Patent
Yamanaka et al.

(10) Patent No.: US 6,893,586 B2
(45) Date of Patent: May 17, 2005

(54) PLASTIC OPTICAL ELEMENT, PLASTIC OPTICAL ELEMENT PRODUCING METHOD AND PLASTIC OPTICAL ELEMENT PRODUCING APPARATUS

(75) Inventors: Yasuo Yamanaka, Kanagawa (JP); Jun Watanabe, Kanagawa (JP); Kiyotaka Sawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 311 days.

(21) Appl. No.: 09/963,634

(22) Filed: Sep. 27, 2001

(65) Prior Publication Data

US 2002/0036747 A1 Mar. 28, 2002

(30) Foreign Application Priority Data

Sep. 28, 2000 (JP) .......................... 2000-295840

(51) Int. Cl.$^7$ ................................. B29D 11/00
(52) U.S. Cl. ..................... 264/2.6; 264/492; 425/174.2; 425/445
(58) Field of Search ........................... 264/1.1, 1.9, 2.5, 264/2.6, 474, 475, 492, 328.14; 425/445, 446, 808, 174.4, 542

(56) References Cited

U.S. PATENT DOCUMENTS

| | | |
|---|---|---|
| 5,603,871 A | 2/1997 | Koseko et al. |
| 6,015,514 A | 1/2000 | Koseko |
| 6,287,504 B1 | 9/2001 | Kanematsu et al. |

FOREIGN PATENT DOCUMENTS

| | | |
|---|---|---|
| JP | 8-201717 | 8/1996 |
| JP | 9-49976 | 2/1997 |
| JP | 10-288749 | 10/1998 |
| JP | 11-77842 | 3/1999 |

*Primary Examiner*—Mathieu D. Vargot
(74) *Attorney, Agent, or Firm*—Oblon, Spivak, McClelland, Maier & Neustadt, P.C.

(57) ABSTRACT

A plastic optical element producing method produces a plastic optical element by an injection molding, and includes the step of cooling the optical element to a room temperature to cool an optical surface of the plastic optical element with priority over other surfaces of the plastic optical element in a state where a temperature of the plastic optical element is within a predetermined temperature range which is less than or equal to a glass transition temperature of the resin material.

33 Claims, 3 Drawing Sheets

PLASTIC OPTICAL ELEMENT, PLASTIC OPTICAL ELEMENT PRODUCING METHOD AND PLASTIC OPTICAL ELEMENT PRODUCING APPARATUS

BACKGROUND OF THE INVENTION

This application claims the benefit of a Japanese Patent Application No.2000-295840 filed Sep. 28, 2000, in the Japanese Patent Office, the disclosure of which is hereby incorporated by reference.

1. Field of the Invention

The present invention generally relates to plastic optical elements, plastic optical element producing methods and plastic optical element producing apparatuses, and more particularly to a plastic optical element which is used in an optical scanning system of a laser digital copying machines, laser printers and facsimile machines or used in an optical equipment such as a video camera, and to a plastic optical element producing method and a plastic optical element producing apparatus for producing such a plastic optical element.

2. Description of the Related Art

In optical elements such as a lens and a prism, a high accuracy is required of the surface shape and internal double refraction. For this reason, conventionally, glass is mainly used for the optical element. Recently however, plastics are used increasingly for the optical element due to the large degree of freedom with which the plastics may be shaped and the high productivity which may be achieved by using the plastics. This trend is supported by the development of resin materials having a low double refraction characteristic, and the improved molding techniques which enable production of a molded product having a highly accurate shape and a low double refraction.

Conventionally, resin materials mainly used for the optical elements include polycarbonate and acrylic resin. However, polycarbonate has a large double refraction, and acrylic resin has a water or moisture absorbing characteristic, thereby limiting the use of such materials for the optical elements. However, resin materials having a low water or moisture absorbing characteristic and a low double refraction have recently been developed, to thereby expand the usage of the resin materials for the optical elements. Such resin materials include Zeonex (product name) manufactured by Nippon Zeon and Arton (product name) manufactured by JSR, for example. In addition, improved molding techniques fill the resin at a low pressure and apply pressure on the entire mold or via an insert to realize an injection molding, to improve the accuracy of the shape of the molded product and to obtain a low double refraction. For these reasons, there is increasing trend to use plastics for the optical elements.

A plastic optical element, such as a plastic scanning lens, which is formed by the injection molding, has a shape with a satisfactory accuracy and a low double refraction. However, a refractive index distribution remains within the molded plastic optical element as indicated by (a) in FIG. 1. Consequently, especially as a high-precision plastic optical element, the optical characteristic that is obtainable is still insufficient and unsatisfactory.

In addition, the refractive index is larger (H: high) towards the surface of the plastic optical element and smaller (L: low) towards the center as indicated by (b) in FIG. 1. For this reason, when the plastic optical element is to form an imaging lens, an error will be generated in the imaging position.

Furthermore, as indicated by (c), (d) and (e) in FIG. 1, the refractive index distribution is also generated at the sub scanning cross section, and this refractive index distribution causes an image surface distortion in the sub scanning beam, that is, a deviation in the focus position. For example, in the case of the optical scanning lens of the laser printer, the refractive index distribution causes the beam spot which is to be converged on a scanning surface to move away from a designed position towards an optical deflector, and the beam spot diameter on the scanning surface becomes larger than a designed value, thereby deteriorating the quality of an image which is written by the optical scanning, as described in a Japanese Laid-Open Patent Application No.10-288749.

The refractive index distribution within the plastic optical element is caused by the following. That is, when molding the resin, a temperature decrease in a vicinity of a wall surface of the mold, that is, at a peripheral portion of the resin, is sharp, but the temperature decrease is gradual at a central portion of the resin. Hence, in a state where the injection filling of the resin is made and the initial applied pressure on the resin is high, the vicinity of the wall surface of the mold is rapidly cooled to solidify the peripheral portion of the resin, and the density of the resin consequently becomes high at the peripheral portion of the resin. But since the applied pressure on the resin is reduced by the time the central portion of the resin is cooled and solidified, the density of the central portion of the resin becomes low. As a result, the density of the resin becomes higher towards the surface of the optical element, and becomes lower towards the central portion of the optical element. Because there is a high correlation between the density and the refractive index, the refractive index becomes larger towards the surface of the optical element, and becomes smaller towards the central portion of the optical element, to thereby generate the refractive index distribution.

The main cause of the refractive index distribution is the rapid cooling of the resin in the vicinity of the wall surface of the mold. Hence, after the resin is injected and filled in a high-temperature mold, it is conceivable to carry out an annealing to gradually cool the resin and reduce the temperature distribution within the molded resin, so that it is possible to obtain a lens having a small refractive index distribution. But according to this conceivable method, a molding cycle becomes extremely long, and the productivity becomes poor to increase the production cost of the optical element.

On the other hand, various methods have been proposed which prescribe the lens shape and use a region of the lens where the refractive index distribution is small. For example, a Japanese Laid-Open Patent Application No.8-201717 proposes an optical scanning unit employing a first method which prescribes the lens shape to satisfy a relationship h/t>2, where t denotes a thickness of the beam in the beam propagating direction and h denotes a height of the beam in a vertical direction to the beam propagating direction. By making the value of h large in this first method, it is possible to reduce the temperature distribution in a region where the beam is transmitted at the time of cooling the resin, and to utilize the small refractive index distribution in this region so as to reduce an error in the imaging position.

In addition, a Japanese Laid-Open Patent Application No.9-49976 proposes a second method which makes an optical design by taking into account the refractive index distribution. According to this second method, it is possible to cope with the error in the imaging position of the imaging lens caused by the refractive index distribution, by modifying the shape of the imaging lens. By shifting the design value of the imaging position towards the rotary polygonal mirror, it is possible to image the beam on the scanning surface.

Moreover, a Japanese Laid-Open Patent Application No.11-77842 proposes a third method which reduces the refractive index distribution during an annealing process. The annealing process heats the resin outside the mold, maintains the resin within a predetermined temperature range for a predetermined time, and then cools the resin. According to this third method, it is possible to reduce the refractive index distribution within the optical element.

However, according to the first method, a region through which the beam is not transmitted, that is, a portion other than an effective region of the optical element, increases. As a result, an mount of resin which is required to form the optical element increases, and it is necessary to make the molding cycle (cooling time) long in order to prevent shrinkage. For this reason, the production cost of the optical device becomes high, and the shape of the optical element such as the lens becomes limited, thereby limiting the degree of freedom with which the optical element may be designed.

According to the second method, the mold is made, the optical element such as the lens is then evaluated after determining the molding conditions to suit the mold, and a shape correcting value is determined thereafter. Consequently, if it becomes necessary to modify the molding conditions due to other inconveniences of the molding, the shape correcting value must be modified accordingly, and a mirror surface insert needs to be remade. Furthermore, when making a mold made up of a large number of dies, the shape correcting value must be changed for each cavity, and it is necessary to create a number of processing programs corresponding to the number of cavities. Accordingly, a number of tries of the molding becomes extremely large, and the number of mirror surface inserts which need to be made increases, to thereby increase the production cost of the optical element.

Moreover, the third method is more effective compared to the first and second methods in that the refraction index distribution can be reduced to a certain extent by the annealing process which takes a short time. However, the third method cannot completely eliminate the retraction index distribution. For this reason, as the precision required of the optical element increases, it becomes necessary to further reduce the refractive index distribution.

SUMMARY OF THE INVENTION

Accordingly, it is a general object of the present invention to provide a novel and useful plastic optical element, plastic optical element producing method and plastic optical element producing apparatus, in which the problems described above are eliminated.

Another and more specific object of the present invention is to provide a plastic optical element which is inexpensive and has a small refractive index distribution, a plastic optical element producing method for producing such a plastic optical element, and a plastic optical element producing apparatus for producing such a plastic optical element.

Still another object of the present invention is to provide a plastic optical element producing method for producing a plastic optical element by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be naturally cooled, including cooling the optical surface of the plastic optical element with priority in a state where a temperature of the plastic optical element is within a predetermined temperature range which is less than or equal to a glass transition temperature of the resin material.

The plastic optical element producing method may further comprise the step of: (b) annealing at least a portion of a surface of the plastic optical element other than the optical surface.

On the other hand, the plastic optical element producing method may further comprise the step of: (b) annealing at least a portion of a surface of the plastic optical element other than the optical surface via a temperature control member. In this case, the step (b) may arrange a plurality of plastic optical elements side by side by contacting respective surfaces other than the optical surface, and contact a surface other than the optical surface of each plastic optical element arranged at an outermost position to the temperature control member.

The step (a) may cool the optical surface of the plastic optical element.

According to the plastic optical element producing method of the present invention, it is possible to greatly reduce the refractive index distribution within the plastic optical element.

The step (b) may use a temperature control member having heating means. The step (b) may use a non-contacting heating apparatus as the heating means. The step (b) may use an infrared ray heating apparatus or a high-frequency heating apparatus as the non-contacting heating apparatus. In this case, it is possible to anneal at least a portion of the surface of the plastic optical element other than the optical surface by a simple structure, and the refractive index distribution within the plastic optical element can greatly be reduced.

The plastic optical element producing method may further comprise the step of: (b) annealing the optical surface of the plastic optical element via a temperature control member. The plastic optical element producing method may further comprise the step of: (c) controlling a temperature of the temperature control member depending on a surrounding temperature.

The plastic optical element producing method may further comprising the step of: (c) controlling a temperature of the temperature control member depending on a surrounding temperature. In this case, it is possible to carry out an appropriate annealing compared to the natural cooling.

The step (b) may carry out an annealing at a rate of 3° C. per minute or less. It is possible to further reduce the refractive index distribution within the plastic optical element.

In the plastic optical element producing method, a lower limit value of the predetermined temperature range may be [GTT–40° C.], where GTT denotes a glass transition temperature of the resin material. The plastic optical element producing method may further comprise the step of: (b) heating the plastic optical element which has a temperature lower the predetermined temperature range up to a temperature within the predetermined temperature range before carrying out an annealing with respect to the plastic optical element. The step (b) may maintain the temperature of the plastic optical element within the predetermined temperature range until the annealing is started. Alternatively, the plastic optical element producing method may further comprise the step of: (b) cooling the plastic optical element which has a temperature higher the predetermined temperature range down to a temperature within the predetermined temperature range before carrying out an annealing with respect to the plastic optical element. The step (b) may maintain the temperature of the plastic optical element within the predetermined temperature range until the annealing is started. In this case, it is possible to greatly reduce the refractive index distribution within the plastic optical element.

A further object of the present invention is to provide a plastic optical element producing apparatus for producing a plastic optical element by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be naturally cooled, including at least one temperature control member contacting at least a portion of a surface of the plastic optical element other than the optical surface to carry out an annealing with respect to the plastic optical element during a resin cooling process when a temperature of the plastic optical element falls within a predetermined temperature range lower than or equal to a glass transition temperature of the resin material.

The plastic optical element producing apparatus may comprise a pair of temperature control members, wherein a plurality of plastic optical elements are arranged side by side by contacting respective surfaces other than the optical surface, and each of the pair of temperature control members contacts a surface other than the optical surface of a corresponding one of the plastic optical elements arranged at an outermost position so that the plurality of plastic optical elements are sandwiched between the pair of temperature control members.

According to the plastic optical element producing apparatus of the present invention, the temperature distribution within the resin is made uniform and relieved before the annealing process is carried out. For this reason, it is possible to reduce the refractive index distribution of the plastic optical element which otherwise has a large refractive index distribution by the natural cooling after the molding.

The temperature control member may include heating means. The heating means may include a non-contacting heating apparatus. The non-contacting heating apparatus may include an infrared ray heating apparatus or a high-frequency heating apparatus.

According to the plastic optical element producing apparatus of the present invention, it is possible to greatly reduce the refractive index distribution within the plastic optical element.

Another object of the present invention is to provide a plastic optical element producing apparatus for producing a plastic optical element by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be naturally cooled, including at least one temperature control member contacting and cooling the optical surface of the plastic optical element during a resin cooling process when a temperature of the plastic optical element falls within a predetermined temperature range lower than or equal to a glass transition temperature of the resin material. According to the plastic optical element producing apparatus of the present invention, it is possible to greatly reduce the refractive index distribution within the plastic optical element.

The temperature control member may control the temperature of the plastic optical element depending on a surrounding temperature. In this case, it is possible to carry out an appropriate annealing compared to natural cooling.

The plastic optical element producing apparatus may further comprise means for annealing at least the portion of the surface of the plastic optical element other than the optical surface at a rate of 3° C. per minute or less. In this case, it is possible to greatly reduce the refractive index distribution within the plastic optical element.

The plastic optical element producing apparatus may comprise a plurality of temperature control members, wherein each of the plurality of temperature control members is used for an annealing until the annealing is completed within one cycle of the resin cooling process. In this case, it is possible to improve the productivity and thus reduce the production cost.

A lower limit value of the predetermined temperature range may be [GTT–40° C.], where GTT denotes a glass transition temperature of the resin material. The plastic optical element producing apparatus may further comprise means for heating the plastic optical element which has a temperature lower the predetermined temperature range up to a temperature within the predetermined temperature range before carrying out an annealing with respect to the plastic optical element. The means may maintain the temperature of the plastic optical element within the predetermined temperature range until the annealing is started. Alternatively, the plastic optical element producing apparatus may further comprise means for cooling the plastic optical element which has a temperature higher the predetermined temperature range down to a temperature within the predetermined temperature range before carrying out an annealing with respect to the plastic optical element. The means may maintain the temperature of the plastic optical element within the predetermined temperature range until the annealing is started. In this case, it is possible to greatly reduce the refractive index distribution within the plastic optical element.

Still another object of the present invention is to provide a plastic optical element which is produced by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be naturally cooled, such that the optical surface of the plastic optical element is cooled with priority during a resin cooling process in a state where a temperature of the plastic optical element is within a predetermined temperature range which is less than or equal to a glass transition temperature of the resin material. According to the plastic optical element of the present invention, the refractive index distribution inside is greatly reduced.

A further object of the present invention is to provide a plastic optical element which is produced by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be naturally cooled, such that at least a portion of a surface of the plastic optical element other than the optical surface is contacted by at least one temperature control member to carry out an annealing with respect to the plastic optical element during a resin cooling process when a temperature of the plastic optical element falls within a predetermined temperature range lower than or equal to a glass transition temperature of the resin material. According to the plastic optical element of the present invention, the refractive index distribution inside is greatly reduced.

Another object of the present invention is to provide a plastic optical element comprising an optical surface through which an incoming light is transmitted in a light transmitting direction; and a side surface, wherein a refractive index distribution is formed in the light transmitting direction. According to the plastic optical element of the present invention, the refractive index distribution inside is greatly reduced.

Other objects and further features of the present invention will be apparent from the following detailed description when read in conjunction with the accompanying drawings.

DESCRIPTION OF THE PREFERRED EMBODIMENTS

Figure 2:
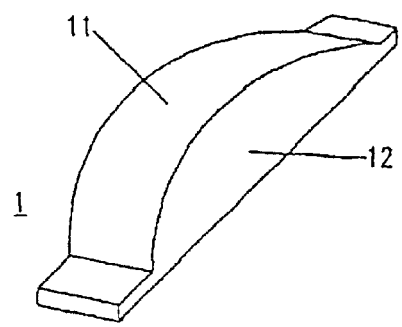
FIG. 2 is a perspective view generally showing an embodiment of a plastic optical element according to the present invention.

FIG. 2 is a perspective view generally showing an embodiment of a plastic optical element according to the present invention. This embodiment of the plastic optical element is produced by a first embodiment of a plastic optical element producing method according to the present invention. In this embodiment, the present invention is applied to a scanning lens. This embodiment is applied to an injection molding which uses a mold having a cavity of a predetermined volume, and at least one transfer surface is formed in a cavity surface which defines the cavity. A melted resin is injected into the mold, and the transfer surface which forms an optical surface of the scanning lens is transferred by a resin pressure generated within the cavity. A molded product, that is, the scanning lens, is removed from the mold, and is naturally cooled (or self-cooled).

A scanning lens 1 shown in FIG. 2, which is usable in a laser printer, is made of a resin such as Zeonex (product name) manufactured by Nippon Zeon. The scanning lens 1 is molded from the resin by injection molding, and after being removed from a mold, the scanning lens 1 is cooled according to this first embodiment of the plastic optical element producing method. More particularly, only a non-optical surface, such as a side surface, of the scanning lens 1 is naturally cooled to room temperature, as will be described later.

In FIG. 2, upper and lower surfaces of the scanning lens 1 form optical surfaces 11 of the scanning lens 1. When the scanning lens 1 is assembled within the laser printer, a laser beam is transmitted through the scanning lens 1 by being input from the lower optical surface 11 and output from the upper optical surface 11. Side surfaces 12 are formed on both sides of the upper and lower optical surfaces 11.

Figure 3:
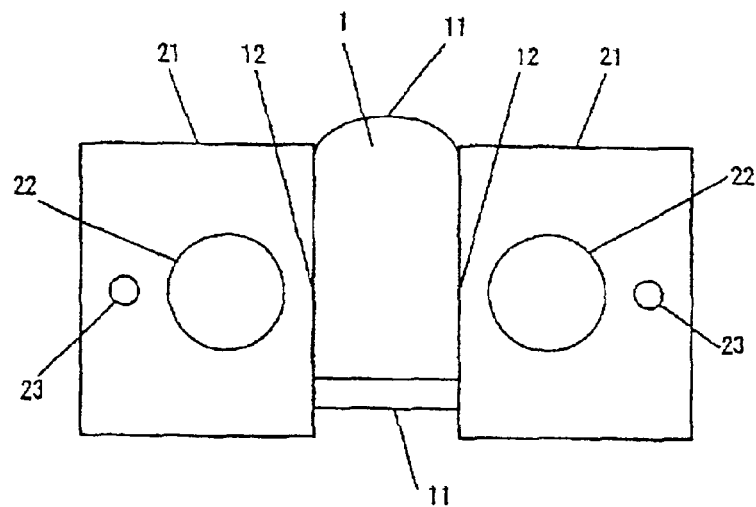
FIG. 3 is a cross sectional view generally showing a structure of a first embodiment of a plastic optical element producing apparatus according to the present invention.

FIG. 3 is a cross sectional view generally showing a structure of a first embodiment of a plastic optical element producing apparatus according to the present invention. This first embodiment of the plastic optical element producing apparatus employs the first embodiment of the plastic optical element producing method.

The plastic optical element producing apparatus shown in FIG. 3 includes a pair of temperature control members 21. Each temperature control member 21 has therein a temperature control means made up of a cartridge heater 22 and a thermocouple 23. The pair of temperature control members 21 are set so as to lightly contact the side surfaces 12 of the scanning lens 1. In addition, the cartridge heater 22 and the thermocouple 23 are connected to an external temperature control unit (not shown). The temperature control unit controls voltages supplied to the cartridge heater 22 and the thermocouple 23 while taking into account an atmospheric or surrounding temperature, so that each temperature control member 21 is controlled to an appropriate temperature.

Next, a description will be given of the operation of this first embodiment of the plastic optical element producing apparatus.

First, the scanning lens 1 which is sandwiched between the pair of temperature control members 21 is put into a temperature controlled bath (not shown), heated to an arbitrary temperature within a predetermined temperature range, and maintained at the arbitrary temperature for a predetermined time. Hence, the scanning lens 1 is uniformly heated and relieved during the predetermined time to the inside of the scanning lens 1, and the refractive index distribution which occurs when the scanning lens 1 is naturally cooled to room temperature after the molding is reduced. Then, the scanning lens 1 is removed from the temperature controlled bath in the state sandwiched between the pair of temperature control members 21, and is placed in a room temperature environment. The scanning lens 2 is annealed at a rate of 3° C. per minute or less by the cartridge heater 22 and the thermocouple 23 which form the temperature control means, until the temperature of the scanning lens 1 (that is, the temperature control means) reaches a temperature which is less than or equal to a lower limit value of the predetermined temperature range. As a result, the optical surfaces 11 of the scanning lens 1 are cooled with priority within the predetermined temperature range.

According to this embodiment, although the refractive index distribution is generated depending on the temperature distribution at the time of cooling the resin of the scanning lens, the temperature distribution is generated in a light transmitting direction in which the light is transmitted through the scanning lens. For this reason, the refractive index distribution is also generated in the light transmitting direction. In this state, even if a slight refractive index distribution remains, the refractive index distribution in the light transmitting direction does not affect the error of the imaging position, and therefore, it is possible to obtain a high-quality scanning lens having a small error in the imaging position. In the case of the optical lens, a position of the beam spot to be converged on a scanning surface becomes close to the designed position of the beam spot, and the quality of the image which is written can be improved.

It is important that the predetermined temperature range is set greater than or equal to [GTT–40° C.] and less than or equal to GTT, where GTT denotes a glass transition temperature of the resin material used for the scanning lens. From experiments conducted by the present inventors, it was found that a temperature region in which the refractive index distribution is formed falls within a range of –40° C. with reference to the glass transition temperature of the resin material used for the scanning lens. For this reason, it was confirmed that the resin material does not need to be annealed to an unnecessarily low temperature region, and that the scanning lens, that is, the optical element, having the small refractive index distribution, can be made within a short time.

The resin material, Zeonex, used in the first embodiment, has a glass transition temperature of approximately 137° C. Hence, the predetermined temperature range in this case becomes approximately 97° C. to approximately 137° C.

The resin material used is not limited to tat described above, and any amorphous thermoplastic material may be used. Since the glass transition temperature differs depending on the resin material, the predetermined temperature range described above differs depending on the resin material used.

In the first embodiment, the cartridge heater 22 of the temperature control means has a rod shape. However, the cartridge heater 22 may be replaced by various electrical heaters such as a plate-shaped heating element, a film-shaped heating element and a sheet heating element.

Figure 4:
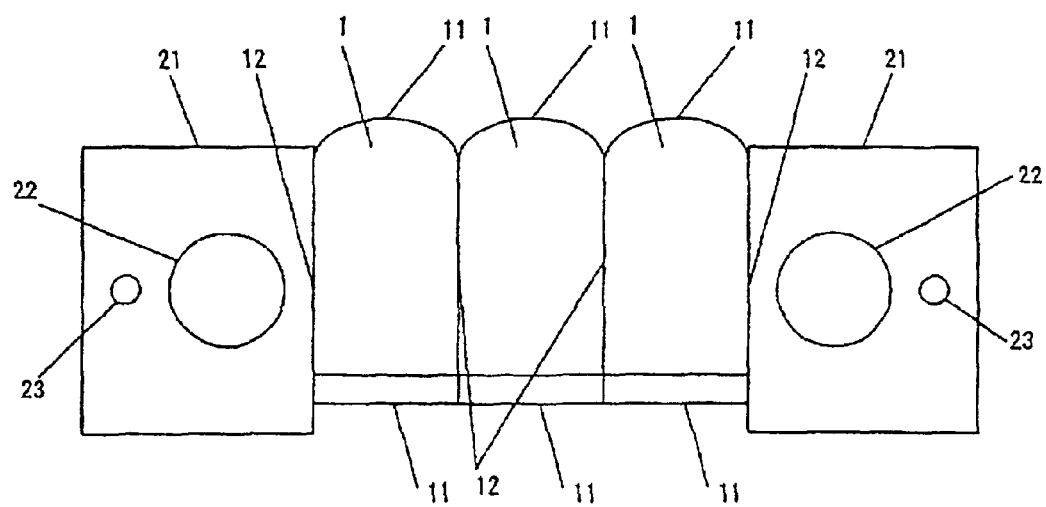
FIG. 4 is a cross sectional view generally showing a structure of a second embodiment of the plastic optical element producing apparatus according to the present invention.

FIG. 4 is a cross sectional view generally showing a structure of a second embodiment of the plastic optical element producing apparatus according to the present invention. This second embodiment of the plastic optical element producing apparatus employs a second embodiment of the plastic optical element producing method according to the present invention. In FIG. 4, those parts which are the same as those corresponding parts in FIG. 3 are designated by the same reference numerals, and a description thereof will be omitted.

In FIG. 4, a plurality of scanning lenses 1 are arranged side by side so that corresponding side surfaces 12 thereof contact each other, and the plurality of scanning lenses 1 are sandwiched between the pair of temperature control members 21. In this case, the side surfaces 12 of the outer two scanning lenses 1 contact the pair of temperature control members 21. The scanning lenses 1 are annealed at a rate of 3° C. per minute, and the optical surfaces 11 of each of the scanning lenses 1 are cooled with priority within the predetermined temperature range. Of course, the number of scanning lenses 1 which are arranged side by side is not limited to three as shown in FIG. 4.

Figure 5:
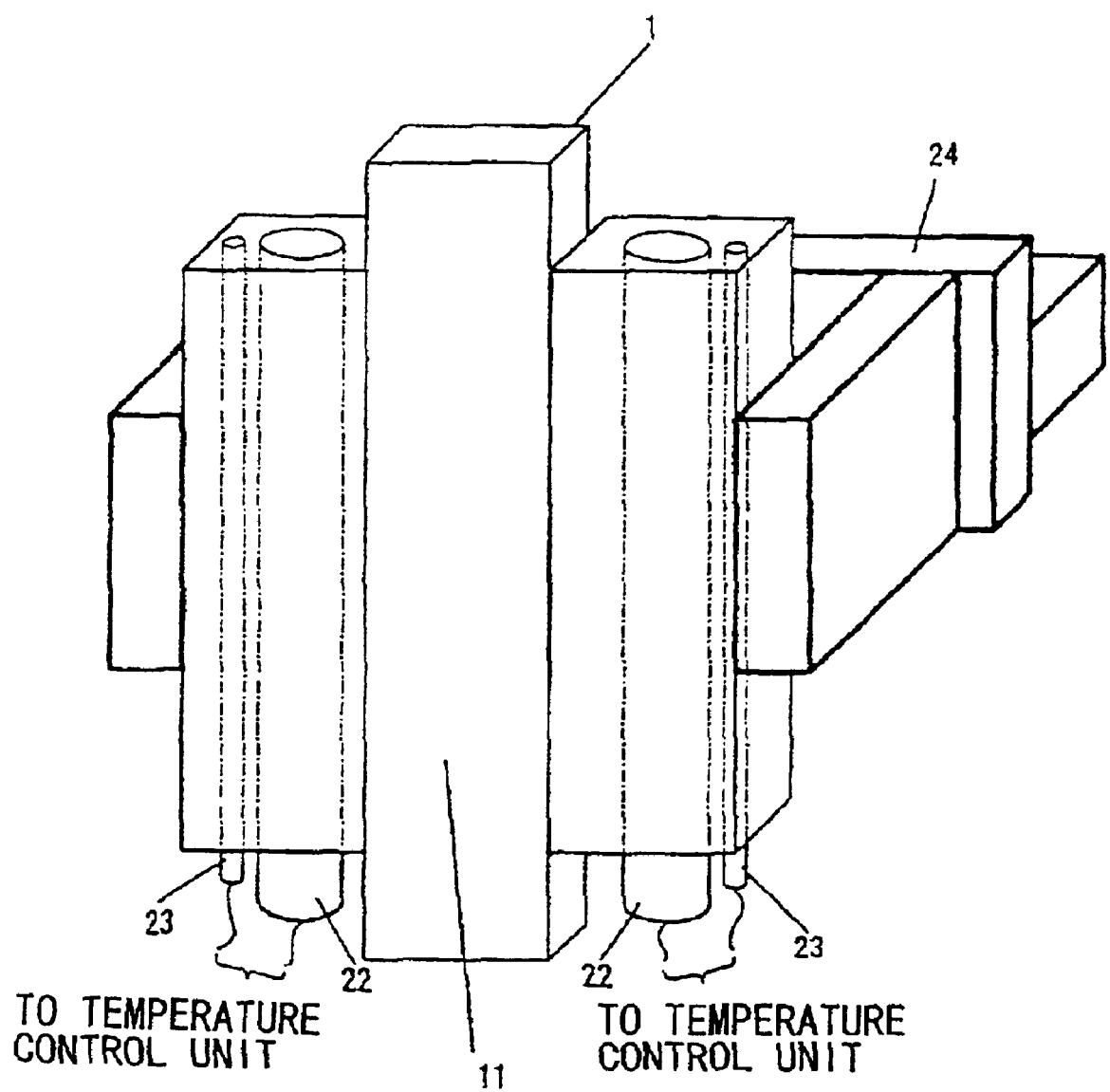
FIG. 5 is a diagram showing a structure of a third embodiment of the plastic optical element producing apparatus according to the present invention.

FIG. 5 is a diagram showing a structure of a third embodiment of the plastic optical element producing apparatus according to the present invention. This third embodiment of the plastic optical element producing apparatus employs a third embodiment of the plastic optical element producing method according to the present invention. In FIG. 5, those parts which are the same as those corresponding parts in FIG. 3 are designated by the same reference numerals, and a description thereof will be omitted.

In FIG. 5, the pair of temperature control members 21 is mounted on a hand part 24 of an automatic tripper which is used for chucking a molded resin product, that is, the scanning lens 1. The automatic tripper is set up next to an injection molding apparatus (not shown) which molds the resin product, that is, the scanning lens 1. The pair of temperature control members 21 mounted on the hand part 24 sandwich the scanning lens 1, so that the side surfaces 12 of the scanning lens 1 contact the corresponding temperature control members 21. Each temperature control member 21 is provided with the cartridge heater 22 and the thermocouple 23 which are connected to and controlled by the external temperature control unit (not shown).

Next, a description will be given of the operation of this third embodiment of the plastic optical element producing apparatus.

First, the injection molding apparatus molds the scanning lens 1 by injection molding, and the molded scanning lens 1 is removed from the mold by the automatic tripper which is provided with the temperature control members 21. The scanning lens 1 is annealed by the temperature control means at a rate of 30° C. per minute, until the temperature of the scanning lens 1 (that is, the temperature control means) becomes less than or equal to the lower limit value of the predetermined temperature range. Hence, the optical surfaces 11 of the scanning lens 1 are cooled with priority, similarly to the first embodiment described above.

It is thus possible to obtain a high-quality scanning lens having small error in the imaging position.

The molding time of one cycle differs depending on the size or thickness of the scanning lens. The molding time of one cycle is long for a scanning lens having a large thickness, and in this case, the optical lens can be annealed similarly to the first embodiment since the desired annealing can be made within one cycle. But when the molding time of one cycle is short and the desired annealing cannot be made within one cycle, it is possible to provide a second automatic tripper in addition to the first automatic tripper. In this case, after the scanning lens is removed from the mold, the scanning lens is held at an arbitrary temperature within the predetermined temperature range by the temperature control members 21 of the first automatic tripper, and then, the scanning lens is supplied to the temperature control members 21 of the second automatic tripper and annealed at the rate of 3° C. per minute until the scanning lens (that is, the temperature control means) reaches the lower limit value of the predetermined temperature range, so as to obtain effects similar to those obtainable in the first embodiment. In this case, it is also possible to cope with a situation where the desired annealing cannot be completed within the molding time of one cycle, and the production cost of the scanning lens can be reduced without deteriorating the productivity.

Next, a description will be given of a fourth embodiment of the plastic optical element producing method according to the present invention. This fourth embodiment of the plastic optical element producing method also produces the scanning lens 1.

First, the scanning lens 1 is put into a temperature controlled bath (not shown), heated to an arbitrary temperature within the predetermined temperature range, and maintained at the arbitrary temperature for a predetermined time.

Hence, the scanning lens 1 is uniformly heated and relieved during the predetermined time to the inside of the scanning lens 1, and the refractive index distribution which occurs when the scanning lens 1 is naturally cooled to room temperature after the molding is reduced. Then, the scanning lens 1 is removed from the temperature controlled bath, and is arranged so as to receive infrared ray irradiation from an infrared ray heating apparatus (not shown) or high-frequency irradiation from a high-frequency heating apparatus (not shown). The infrared ray heating apparatus and the high-frequency heating apparatus are respectively provided with a pair of temperature control means. The scanning lens 1 is annealed at the rate of 3° C. per minute while receiving the infrared ray or high-frequency irradiation until the scanning lens 1 (that is, the temperature control means) reaches the lower limit value of the predetermined temperature range. As a result, the optical surfaces 11 of the scanning lens 1 are cooled with priority within the predetermined temperature range.

Thus, it is possible to obtain a high-quality scanning lens having a small error in the imaging position. In addition, the scanning lens may be moved from the temperature controlled bath to the infrared ray heating apparatus or the high-frequency heating apparatus by use of a conveyer or the like, so that the scanning lens may be annealed efficiently by a continuous process.

Figure 1:
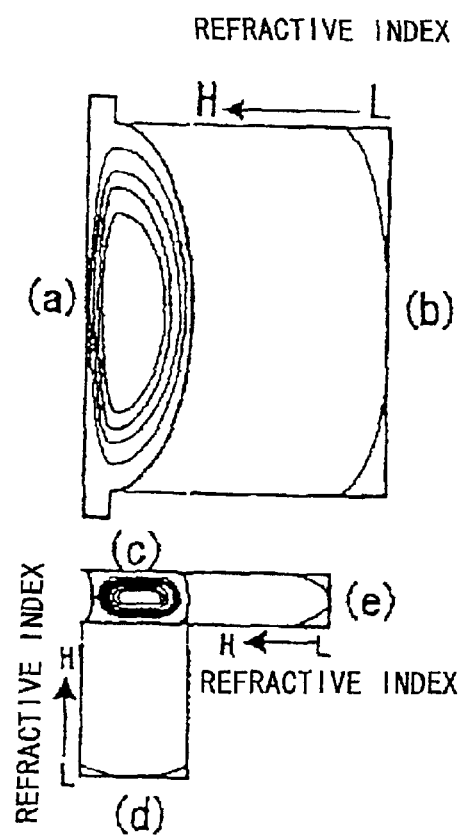
FIG. 1 is a diagram for explaining a refractive index distribution within a scanning lens.

Of course, the plastic optical element is not limited to the scanning lens 1 shown in FIG. 1. The present invention is similarly applicable to various plastic optical elements including cylindrical lenses and elongated lenses.

In the embodiments described above, the temperature control member 21 contacts the side surface 12 of the scanning lens 1. However, the temperature control member 21 may contact the optical surface 11 of the scanning lens 1, so as to similarly control the temperature at the optical surface 11.

In addition, in the described embodiments, the scanning lens 1 which has a temperature lower the predetermined temperature range is heated up to a temperature within the predetermined temperature range before carrying out an annealing with respect to the plastic optical element. However, if the scanning lens 1 has a temperature higher the predetermined temperature range, the scanning lens 1 may be cooled down to a temperature within the predetermined temperature range before carrying out an annealing with respect to the plastic optical element. In either case, the temperature of the scanning lens 1 may be maintained within the predetermined temperature range until the annealing is started.

Further, the present invention is not limited to these embodiments, but various variations and modifications may be made without departing from the scope of the present invention.

What is claimed is:

1. A plastic optical element producing method for producing a plastic optical element by an injection molding which uses a mold having a cavity of a predetermined volume and at least one transfer surface formed in a cavity surface which defines the cavity, comprising the steps of:
   injecting a melted resin material into the mold and transferring the transfer surface which forms an optical surface of the plastic optical element by a resin pressure generated within the cavity, said optical surface being configured to receive and/or output light;
   removing the plastic optical element from the mold; and
   cooling the optical element to a room temperature by cooling the optical surface of the plastic optical element with priority over other surfaces of the plastic optical element in a state where a temperature of the plastic optical element is within a predetermined temperature range which is less than or equal to a glass transition temperature of the resin material.

2. The plastic optical element producing method as claimed in claim 1, wherein said cooling comprises:
   annealing at least a portion of a surface of the plastic optical element other than the optical surface.

3. The plastic optical element producing method as claimed in claim 1, wherein said cooling comprises:
   annealing at least a portion of a surface of the plastic optical element other than the optical surface via a temperature control member.

4. The plastic optical element producing method as claimed in claim 3, wherein said annealing arranges a plurality of plastic optical elements side by side by contacting respective surfaces other than the optical surface, and contacts a surface other than the optical surface of each plastic optical element arranged at an outermost position to the temperature control member.

5. The plastic optical element producing method as claimed in claim 3, wherein said annealing uses a temperature control member having heating means.

6. The plastic optical element producing method as claimed in claim 5, wherein said annealing uses a non-contacting heating apparatus as the heating means.

7. The plastic optical element producing method as claimed in claim 6, wherein said annealing uses an infrared ray heating apparatus or a high-frequency heating apparatus as the non-contacting heating apparatus.

8. The plastic optical element producing method as claimed in claim 1, wherein said cooling comprises:
   annealing the optical surface of the plastic optical element via a temperature control member.

9. The plastic optical element producing method as claimed in claim 8, further comprising:
   controlling a temperature of the temperature control member depending on a surrounding temperature.

10. The plastic optical element producing method as claimed in claim 3, further comprising:
    controlling a temperature of the temperature control member depending on a surrounding temperature.

11. The plastic optical element producing method as claimed in claim 2, wherein said annealing carries out an annealing at a rate of 3° C. per minute or less.

12. The plastic optical element producing method as claimed in claim 1, wherein a lower limit value of the predetermined temperature range is [GTT–40° C.], where GTT denotes a glass transition temperature of the resin material.

13. The plastic optical element producing method as claimed in claim 1, further comprising:
    heating the plastic optical element which has a temperature lower the predetermined temperature range up to a temperature within the predetermined temperature range before carrying out an annealing with respect to the plastic optical element.

14. The plastic optical element producing method as claimed in claim 13, wherein said heating maintains the temperature of the plastic optical element within the predetermined temperature range until the annealing is started.

15. The plastic optical element producing method as claimed in claim 1, wherein said cooling comprises:
    cooling the plastic optical element which has a temperature higher than the predetermined temperature range down to a temperature within the predetermined temperature range before carrying out an annealing with respect to the plastic optical element.

16. The plastic optical element producing method as claimed in claim 15, wherein said cooling maintains the temperature of the plastic optical element within the predetermined temperature range until the annealing is started.

17. A plastic optical element producing apparatus for producing a plastic optical element by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be cooled to a room temperature, said optical surface being configured to receive and/or output light, comprising:

at least one temperature control member contacting at least a portion of a surface of the plastic optical element other than the optical surface, the at least a portion of a surface excluding the optical surface, to carry out an annealing with respect to the plastic optical element during a resin cooling process when a temperature of the plastic optical element falls within a predetermined temperature range lower than or equal to a glass transition temperature of the resin material.

18. The plastic optical element producing apparatus as claimed in claim 17, comprising a pair of temperature control members, wherein a plurality of plastic optical elements are arranged side by side by contacting respective surfaces other than the optical surface, and each of the pair of temperature control members contacts a surface other than the optical surface of a corresponding one of the plastic optical elements arranged at an outermost position so that the plurality of plastic optical elements are sandwiched between the pair of temperature control members.

19. The plastic optical element producing apparatus as claimed in claim 17, wherein said temperature control member includes heating means.

20. The plastic optical element producing apparatus as claimed in claim 19, wherein said heating means includes a non-contacting heating apparatus.

21. The plastic optical element producing apparatus as claimed in claim 20, wherein said non-contacting heating apparatus includes an infrared ray heating apparatus or a high-frequency heating apparatus.

22. A plastic optical element producing apparatus for producing a plastic optical element by an injection molding which uses a mold having a cavity of a predetermined volume and at least one transfer surface formed in a cavity surface which defines the cavity, injects a melted resin material into the mold and transfers the transfer surface which forms an optical surface of the plastic optical element by a resin pressure generated within the cavity, and removes the plastic optical element from the mold to be cooled to a room temperature, said optical surface being configured to receive and/or output light, comprising:

at least one temperature control member contacting and cooling the optical surface of the plastic optical element with priority over other surfaces of the plastic optical element during a resin cooling process when a temperature of the plastic optical element falls within a predetermined temperature range lower than or equal to a glass transition temperature of the resin material.

23. The plastic optical element producing apparatus as claimed in claim 17, wherein said temperature control member controls the temperature of the plastic optical element depending on a surrounding temperature.

24. The plastic optical element producing apparatus as claimed in claim 22, wherein said temperature control member controls the temperature of the plastic optical element depending on a surrounding temperature.

25. The plastic optical element producing apparatus as claimed in claim 17, further comprising:

means for annealing at least the portion of the surface of the plastic optical element other than the optical surface at a rate of 3° C. per minute or less.

26. The plastic optical element producing apparatus as claimed in claim 22, further comprising:

means for annealing at least a portion of a surface of the plastic optical element other than the optical surface at a rate of 3° C. per minute or less.

27. The plastic optical element producing apparatus as claimed in claim 17, comprising a plurality of temperature control members, wherein each of the plurality of temperature control members is used for an annealing until the annealing is completed within one cycle of the resin cooling process.

28. The plastic optical element producing apparatus as claimed in claim 17, wherein a lower limit value of the predetermined temperature range is [GTT–40° C.], where GTT denotes a glass transition temperature of the resin material.

29. The plastic optical element producing apparatus as claimed in claim 22, wherein a lower limit value of the predetermined temperature range is [GTT–40° C.], where GTT denotes a glass transition temperature of the resin material.

30. The plastic optical element producing apparatus as claimed in claim 17, further comprising:

means for heating the plastic optical element which has a temperature lower the predetermined temperature range up to a temperature within the predetermined temperature range before carrying out an annealing with respect to the plastic optical element.

31. The plastic optical element producing apparatus as claimed in claim 30, wherein said means maintains the temperature of the plastic optical element within the predetermined temperature range until the annealing is started.

32. The plastic optical element producing apparatus as claimed in claim 17, further comprising:

means for cooling the plastic optical element which has a temperature higher the predetermined temperature range down to a temperature within the predetermined temperature range before carrying out an annealing with respect to the plastic optical element.

33. The plastic optical element producing apparatus as claimed in claim 32, wherein said means maintains the temperature of the plastic optical element within the predetermined temperature range until the annealing is started.

* * * * *